United States Patent
Izawa et al.

(10) Patent No.: US 10,745,809 B2
(45) Date of Patent: Aug. 18, 2020

(54) METHOD FOR PRODUCING LAMINATED MEMBER

(71) Applicants: NISSAN MOTOR CO., LTD., Yokohama-shi, Kanagawa (JP); FUKUDA METAL FOIL & POWDER CO., LTD., Shimogyo-ku, Kyoto-shi, Kyoto (JP)

(72) Inventors: Yoshinori Izawa, Kanagawa (JP); Junichi Arai, Kanagawa (JP); Yutaka Mabuchi, Kanagawa (JP); Katsunori Otobe, Kyoto (JP); Shinichi Nishimura, Kyoto (JP)

(73) Assignees: NISSAN MOTOR CO., LTD., Yokohama-shi (JP); FUKUDA METAL FOIL & POWDER CO., LTD., Kyoto-shi (JP)

( * ) Notice: Subject to any disclaimer, the term of this patent is extended or adjusted under 35 U.S.C. 154(b) by 0 days.

(21) Appl. No.: 16/483,338

(22) PCT Filed: Feb. 2, 2018

(86) PCT No.: PCT/IB2018/000149
§ 371 (c)(1),
(2) Date: Aug. 2, 2019

(87) PCT Pub. No.: WO2018/142219
PCT Pub. Date: Aug. 9, 2018

(65) Prior Publication Data
US 2019/0368049 A1    Dec. 5, 2019

(30) Foreign Application Priority Data

Feb. 3, 2017    (JP) .................. 2017-018558

(51) Int. Cl.
*C23C 24/04*    (2006.01)
*C22C 9/06*    (2006.01)
*F01L 3/04*    (2006.01)

(52) U.S. Cl.
CPC ............... *C23C 24/04* (2013.01); *C22C 9/06* (2013.01); *F01L 3/04* (2013.01); *F01L 2103/00* (2013.01)

(58) Field of Classification Search
CPC ..... B05D 1/12; B22F 1/00; B22F 7/04; B23K 35/30; B32B 15/00; B32B 37/00;
(Continued)

(56) References Cited

U.S. PATENT DOCUMENTS 5,188,799 A    2/1993    Mori et al.
2006/0093736 A1    5/2006    Raybould et al.
(Continued)

FOREIGN PATENT DOCUMENTS

CN    101285187 A    10/2008
CN    102039384 A  *  5/2011
(Continued)

*Primary Examiner* — Alexander M Weddle
(74) *Attorney, Agent, or Firm* — Foley & Lardner LLP (57) ABSTRACT

A method for producing a laminated member includes a step of spraying a mixture in a non-molten state including a plurality of precipitation hardening copper alloy particles and a plurality of hard particles that have non-spherical shapes having a median aspect ratio of equal to or more than 1.2 and are harder than the copper alloy particles onto a base substrate to form a coating layer on the base substrate.

16 Claims, 6 Drawing Sheets

(58) Field of Classification Search
CPC ... C22C 9/00; C22C 9/06; C23C 24/04; F01L 2103/00; F01L 3/02; F01L 3/04
See application file for complete search history.

(56) References Cited

U.S. PATENT DOCUMENTS

| | | |
|---|---|---|
| 2008/0220234 A1 | 9/2008 | Ko et al. |
| 2018/0223902 A1 | 8/2018 | Izawa |

FOREIGN PATENT DOCUMENTS

| | | |
|---|---|---|
| JP | 2007-270206 A | 10/2007 |
| JP | 2008-519157 A | 6/2008 |
| JP | 2008-534788 A | 8/2008 |
| JP | 5202024 B2 | 6/2013 |
| JP | 2015-203150 A | 11/2015 |
| WO | WO-2017/022505 A1 | 2/2017 |

\* cited by examiner

METHOD FOR PRODUCING LAMINATED MEMBER

TECHNICAL FIELD

The present invention relates to a method for producing a laminated member. For example, the laminated member can be used as a sliding member.

BACKGROUND ART

Patent Document 1 discloses a method of forming a hard coating that enables forming a hard coating on the surface of a base substrate through deformation-induced transformation in a cold state. The method of forming the hard coating involves spraying a metal powder in a solid state onto the surface of a base substrate along with compressed gas as a medium so as to form a hard metal coating. In the forming method, the metal powder is made of a metal material that can undergo deformation-induced transformation. The method involves spraying the metal powder onto the base substrate at such a high speed that causes deformation-induced transformation, so as to accumulate and layer the metal powder on the surface of the base substrate while plastically deforming the metal powder into a flat shape as well as to cause deformation-induced transformation of the metal powder that has been accumulated. This forming method is characterized in that the metal coating formed on the base substrate is harder than the metal powder to be sprayed onto the base substrate.

CITATION LIST

Patent Document

Patent Document 1: JP 5202024B

SUMMARY OF INVENTION

Technical Problem

However, a problem with the method of forming a hard coating of Patent Document 1 is the insufficient formation efficiency of the coating.

The present invention was made in view of the problem with the prior art. It is an object of the present invention to provide a method for producing a laminated member with high formation efficiency of a coating layer.

Solution to Problem

The present inventors conducted a keen study in order to achieve the above-described object. As a result, the present inventors found that the above-described object can be achieved by a step of spraying a mixture in a non-molten state including precipitation hardening copper alloy particles and hard particles that have non-spherical shapes having a median aspect ratio of equal to or more than 1.2 and are harder than the copper alloy particles onto a base substrate to form a coating layer on the base substrate. The present invention was thus completed.

Advantageous Effects of Invention

With the present invention, it is possible to provide a method for producing a laminated member, which has high formation efficiency of a coating layer.

DESCRIPTION OF EMBODIMENTS

Hereinafter, a method for producing a laminated member and the laminated member according to an embodiment of the present invention will be described.

First Embodiment

First, a method for producing a laminated member according to a first embodiment of the present invention will be described. The method for producing the laminated member of this embodiment includes a step of spraying a mixture in a non-molten state including precipitation hardening copper alloy particles and hard particles that have non-spherical shapes having a median aspect ratio of equal to or more than 1.2 and are harder than the copper alloy particles onto a base substrate to form a coating layer on the base substrate.

As used herein, a precipitation-hardening copper alloy means not only a copper alloy that has already been precipitation-hardened but also a copper alloy that has not been precipitation-hardened yet. It is preferred that all of the copper alloy particles are made of copper alloy that has not been precipitation-hardened yet. However, the copper alloy particles are not limited thereto. For example, a part of the copper alloy particles may be made of a copper alloy that has already been precipitation-hardened, and the reminder of the copper alloy particles are made of a copper alloy that has not been precipitation-hardened yet. A precipitation-hardening copper alloy is also referred to as a particle dispersion-strengthened copper alloy.

As used herein, an "aspect ratio" is defined as "(longest diameter)/(width perpendicular to longest diameter)" of observed copper alloy particles or hard particles. Further, a "longest diameter" means the maximum distance between any two points on the contour of a particle when the particle is observed under a scanning electron microscope (SEM) or the like. To determine median aspect ratio, for example, approximately three to thirty particles, at least three to five particles, may be observed and measured in several to dozens of fields of view. For example, an image analytical particle size distribution measuring instrument can be used to measure and calculate the aspect ratio. Alternatively, it is certainly possible that the aspect ratio can be measured and calculated by enlarging a scanning electron microscopic (SEM) image of particles and measuring and calculating the size with a scale.

In the present invention, the hardness of the copper alloy particles and the hard particles can be represented by Vickers hardness that is measured and calculated by the Vickers hardness test (JIS Z 2244) specified in the Japan Industrial Standard. For example, the Vickers hardness of particles is an arithmetic average of around three to thirty particles, at least around three to five particles.

As described above, in the method for producing the laminated member of this embodiment, the mixture containing the precipitation hardening copper alloy particles and the hard particles are sprayed onto the base substrate, in which the copper alloy particles is in a non-molten state to prevent deposition of an additive element, and the hard particles are in a non-molten state to maintain the non-spherical shapes with a median aspect ratio of 1.2 or more and the hardness of the hard particles is greater than the hardness of the copper alloy particles. Compared to a method that involves spraying only austenitic stainless-steel particles having a spherical shape onto a base substrate, the copper alloy particles and the hard particles are more likely to adhere to the base substrate in the method of this embodiment. The median aspect ratio of the hard particles, which represents the shape thereof, is preferably equal to or greater than 1.3, more preferably equal to or greater than 1.4, yet more preferably equal to or greater than 1.5. However, the median is not particularly limited. In terms of the abrasion resistance, it is preferred that the median aspect ratio of the hard particles, which represents the shape thereof, is equal to or greater than 1.3. Further, the median aspect ratio of the hard particles, which represents the shape thereof, is preferably equal to or less than 2.0, more preferably equal to or less than 1.9. When the median aspect ratio of the hard particles, which represents the shape thereof, is less than 1.2, the hard particles have little difference from spherical particles, and the desired effects are not obtained.

As a result, it is possible to form a coating layer on the base substrate with high formation efficiency, which includes a copper alloy portion derived from the precipitation hardening copper alloy particles and a hard particle portion derived from the hard particles that have non-spherical shapes with a median aspect ratio of 1.2 or more and are harder than the copper alloy particles, in which the portions are bonded to each other (e.g. a copper alloy portion to another copper alloy portion, a copper alloy portion to a hard particle portion, and a hard particle portion to another hard particle portion) via an interface. That is, it is possible to provide a method for producing a laminated member that has high formation efficiency of a coating layer. The hard particle portion is harder than the copper alloy portion.

It is currently assumed that the above-described advantageous effects are obtained based on at least one of the following reasons.

For example, the hard particles, which are sprayed along with the copper alloy particles and are harder than the copper alloy particles, have a predetermined non-spherical shape. This is likely to generate an anchor effect, which is obtained by the hard particles that bite in the base substrate or the copper alloy portions attached on the base substrate, and an effect of binding the hard particles to each other or binding the hard particles to the copper alloy particles. It can be assumed that the effects improve adhesion of the hard particles or the mixture as such.

Further, for example, the hard particles, which are sprayed along with the copper alloy particles and are harder than the copper alloy particles, have a predetermined non-spherical shape. Accordingly, the hard particles have larger specific surface area than spherical particles, and the sprayed hard particles readily gain particle speed by the pressure of operating gas. It can be assumed that this improves adhesion of the hard particles, which is less likely to adhere compared to the copper alloy particles However, even when the above-described advantageous effects are obtained based on the other reasons, it is needless to say that the present invention encompasses such methods and laminated members.

The laminated member thus obtained has a secondary advantage of high abrasion resistance. Further, the laminated member thus obtained has a secondary advantage that the coating layer can secure high heat conductivity. In other words, the coating layer that can improve the abrasion resistance and the heat conductivity can be formed with high formation efficiency by a method such as kinetic spraying, cold spraying or warm spraying.

A more specific production method will be described in more detail.

First, the base substrate is not particularly limited. It is preferred that the base substrate is made of a metal that can be used in a method of forming the coating layer, which will be described in detail later. It is needless to say that when the laminated member is used as a sliding member, it is preferred that the base substrate is made of a material that can endure a high-temperature environment where the sliding member is used.

Examples of metals that are preferably used include alloys of aluminum, iron, titanium, copper or the like known in the art. Examples of aluminum alloys that are preferably used include AC2A, AC8A and ADC12 specified in Japanese Industrial Standard and the like. Examples of iron alloys that are preferably used include SUS304 specified in Japanese Industrial Standard, iron-based sintered alloys and the like. Examples of copper alloys that are preferably used include beryllium copper, copper alloy-based sintered alloys and the like.

The spraying speed of the mixture of the raw materials is not particularly limited. For example, the particle speed ranges preferably from 300 m/s to 1200 m/s, more preferably from 500 m/s to 1000 m/s, yet more preferably from 600 m/s to 800 m/s. However, the particle speed is not limited to these ranges at all, and needless to say, may be out of these ranges as long as the advantageous effects of the present invention are obtained.

The pressure of the operating gas, which is supplied for spraying the mixture, is not particularly limited. For example, the pressure of the operating gas ranges preferably from 2 MPa to 5 MPa, more preferably from 3.5 MPa to 5 MPa. When the pressure of the operating gas is less than 2 MPa, it is difficult to achieve a sufficient particle speed, which may result in the large porosity of the coating layer. However, it is needless to say that the pressure is not limited to these ranges and may be out of these ranges as long as the advantageous effects of the present invention can be obtained.

The temperature of the operating gas is not particularly limited, either. For example, the temperature of the operating gas ranges preferably from 400° C. to 800° C., more preferably from 600° C. to 800° C. When the temperature of the operating gas is less than 400° C., the abrasion resistance may be decreased due to the large porosity of the coating layer. When the temperature of the operating gas is greater than 800° C., the nozzle may sometimes be clogged. However, needless to say, the temperature is not limited to these ranges and may be out of these ranges as long as the advantageous effects of the present invention can be obtained.

The type of the operating gas is not particularly limited. Examples of the operating gas include nitrogen, helium and the like. They may be used alone or in combination of two or more. Further, a mixture of fuel gas and nitrogen may also be used.

After the coating layer is formed, the laminated member may be aged or tempered at 250° C. to 500° C. for a period of 0.5 hour to 4 hours. This can improve the abrasion resistance and the heat conductivity. This aging or tempering may be also done, for example, by utilizing heat from a combustion chamber in a test run in an inspection that is conducted after the engine is assembled.

The copper alloy particles of the raw material are not particularly limited and may be any precipitation hardening copper alloy particles that are in a non-molten state. It is preferred that the copper alloy particles have a non-spherical shape as well as the hard particles. However, the shape is not particularly limited.

The precipitation hardening copper alloy is not particularly limited. However, examples of precipitation hardening copper alloys that are preferably used include precipitation hardening alloys containing nickel and silicon, or so-called Corson alloys. These impart high abrasion resistance.

However, the precipitation hardening copper alloy is not limited thereto. Further examples of the precipitation hardening copper alloys that can be used include precipitation hardening copper alloys containing chromium, or so-called chromium copper, and precipitation hardening copper alloys containing zirconium, or so-called zirconium copper. Yet further examples of the precipitation hardening copper alloys that can be used include precipitation hardening copper alloys that contain one of chromium, zirconium and vanadium or any combination thereof in addition to nickel and silicon. It is possible to use a variety of materials according to the specification of the laminated member required.

For example, with regard to the precipitation hardening copper alloys containing nickel and silicon, the nickel content ranges preferably from 1 mass % to 21 mass % while the silicon content ranges preferably from 0.2 mass % to 8 mass % since higher heat conductivity can be achieved. For example, with regard to the precipitation hardening copper alloys containing chromium, the chromium content ranges preferably from 0.02 mass % to 1 mass % since higher heat conductivity can be achieved. For example, with regard to the precipitation hardening copper alloys containing nickel and silicon, the ratio (Ni:Si) of content of nickel and silicon ranges preferably from 3.5 to 4.5:1 in mass ratio in terms of allowing precipitation of nickel silicide ($Ni_2Si$). However, the precipitation hardening copper alloys are not limited to these ranges and may be out of these ranges as long as the advantageous effects of the present invention can be achieved. It is needless to say that other elements may be further added to the precipitation hardening copper alloys.

It is preferred that the copper alloy particles have a compressive strength of the particles of from 50 $N/mm^2$ to 110 $N/mm^2$. However, the compressive strength is not particularly limited. When such copper alloy particles are used to form the laminated member, higher formation efficiency of the coating layer is achieved since the copper alloy particles readily adhere to the base substrate. Further, the laminated member thus obtained has a secondary advantage of high abrasion resistance. Further, the laminated member thus obtained has a secondary advantage that the coating layer can secure high heat conductivity.

As used herein, "compressive strength of particles" is defined as a load that is applied to the particles with a flat indenter and the like when the particle size in the load applying direction is changed by 10%. The measuring method complies with JIS R 1639-5 "Test methods of properties of fine ceramic granules Part 5: Compressive strength of a single granule", and the test load is 500 mN.

The hard particles of the raw material are not particularly limited and may be any particles in a non-molten state that is harder than the copper alloy particles and have non-spherical shapes having a median aspect ratio of equal to or more than 1.2. The hard particles of the raw material are not particularly limited. However, examples of hard particles that are preferably used include particles produced by water atomization. When particles are produced by water atomization, water strikes electric droplets to deform them. The deformed droplets are cooled by the water and solidified in non-spherical deformed shapes. In contrast, in a technique of spraying gas, particles return to a spherical shape due to insufficient cooling.

Examples of the hard particles include cobalt-based alloy particles, chromium-based alloy particles, nickel-based alloy particles and molybdenum-based alloy particles. They may be used alone or in combination of two or more in a suitable mixture ratio.

Examples of such cobalt-based alloys include TRIBALOY (registered trademark) T-400 and T-800 and the like. Examples of such chromium-based alloys include ferrochromium and the like. Examples of such nickel-based alloys include TRIBALOY (registered trademark) T-700 and the like. Examples of such molybdenum-based alloys include ferromolybdenum and the like. Among them, cobalt-based alloys are preferably used since they have high abrasion resistance. Specifically, TRIBALOY (registered trademark) T-400, T-800 and the like are preferably used.

The average particle size (d50) of the copper alloy particles and the hard particles is not particularly limited. However, it is preferably equal to or less than 50 μm. When such copper alloy particles and hard particles are used to form the laminated member, even higher formation efficiency of the coating layer is achieved since the copper alloy particles and the hard particles readily adhere to the base substrate. The laminated member thus obtained has a secondary advantage of high abrasion resistance. Further, the laminated member thus obtained has a secondary advantage that the coating layer can secure high heat conductivity.

As used herein, "average particle size (d50)" may represent, for example, number average particle size (d50) that is measured and calculated with an image analytical particle size distribution measuring instrument. Further, "particle size" for measuring and calculating the average particle size may represent, for example, the maximum distance between arbitral two points on the contour of an observed particle (in an observation plane). However, the "particle size" is not limited thereto and may represent, for example, the diameter of an equivalent circle of observed powder (in an observation plane). Alternatively, the "average particle size" may represent number average particle size (d50) that is measured and calculated with laser diffraction scattering particle size distribution measuring instrument. However, it is needless to say that the particle size is not limited to these ranges at all and may be out of these ranges as long as the advantageous effects of the present invention can be obtained.

The average particle size (d50) of the hard particles is not particularly limited. However, it ranges preferably from 14 μm to 50 μm, more preferably from 25 μm to 50 μm. When the average particle size (d50) is equal to or greater than 14 m, the suitable fluidity of the mixture can be secured. This can reduce the occurrence of imperfect supply of the particles. When the average particle size (d50) is equal to or less than 50 μm, suitable particle speed can be secured in forming the coating layer. This can reduce the occurrence of imperfect formation of the coating layer. The average particle size (d50) of the copper alloy particles is not particularly limited. However, it ranges preferably from 20 μm to 40 μm.

Second Embodiment

Next, a laminated member according to a second embodiment of the present invention will be described referring to the drawings. The laminated member according to the second embodiment of the present invention is produced by the above-described method for producing the laminated member of the present invention. The dimension of the drawings referred to in the following is exaggerated for descriptive reasons and may be different from the actual dimension.

Figure 1:
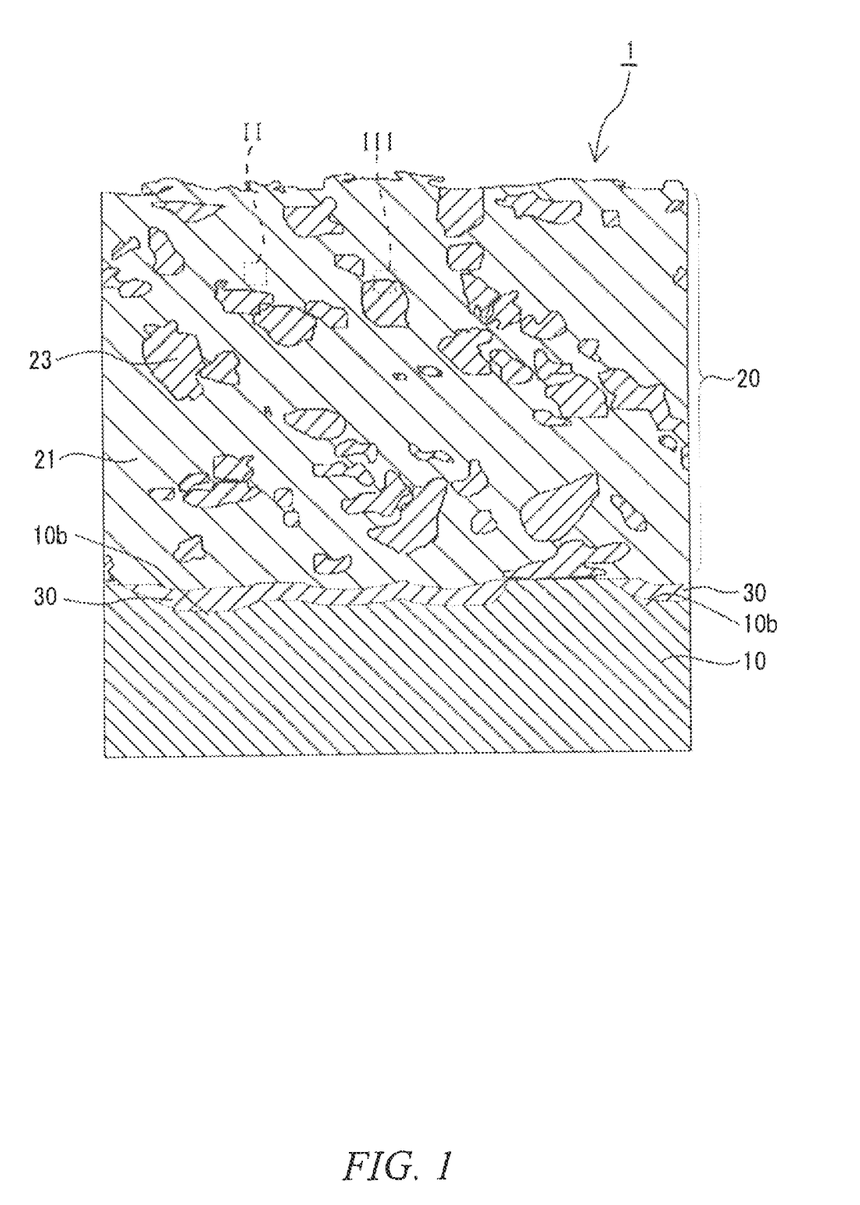
FIG. 1 is a schematic cross-sectional view of a laminated member according to a second embodiment of the present invention.
Figure 2:
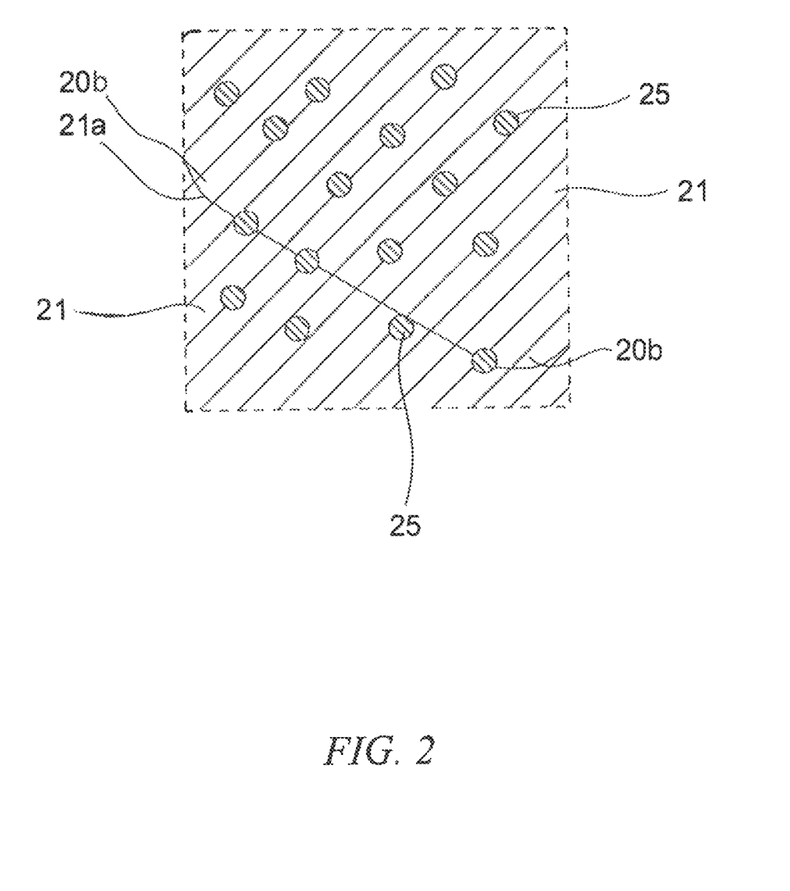
FIG. 2 is an enlargement of the portion enclosed by the line II of the laminated member in FIG. 1.
Figure 3:
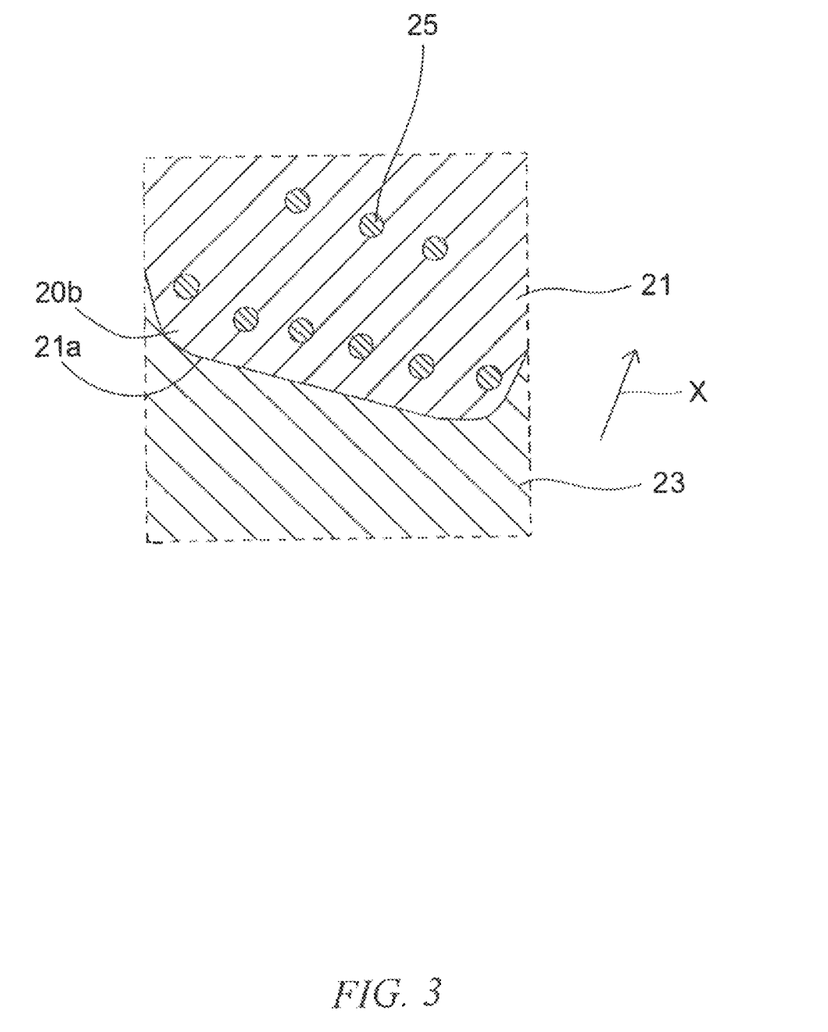
FIG. 3 is an enlargement of the portion enclosed by the line III of the laminated member in FIG. 1.

FIG. 1 is a schematic cross-sectional view of the laminated member according to the second embodiment of the present invention. FIG. 2 is an enlargement of the portion enclosed by the line II of the laminated member in FIG. 1. FIG. 3 is an enlargement of the portion enclosed by the line III of the laminated member in FIG. 1. As illustrated in FIG. 1 to FIG. 3, the laminated member 1 of the embodiment includes a base substrate 10 and a coating layer 20 formed on the base substrate 10. The coating layer 20 includes a copper alloy portion 21 derived from precipitation hardening copper alloy particles and a hard particle portion 23 that is derived from predetermined hard particles and that is harder than the copper alloy portion 21. In the coating layer 20, for example, the copper alloy portions 21, 21 are bonded to each other via the interface. Further, the copper alloy portion 21 is bonded to the hard particle portion 23 via the interface, and the hard particle portions 23, 23 are bonded to each other via the interface.

In the illustrated example, at least one of the copper alloy portions 21 in the coating layer 20 contains at least one precipitation phase 25 inside the copper alloy portion 21 and at the interface 21a between the copper alloy portions 21, 21. For example, when the copper alloy portion 21 is made of a precipitation hardening copper alloy containing nickel and silicon, the precipitation phase 25 is made of nickel silicide ($Ni_2Si$).

In the illustrated example, since the hard particle portion 23 is harder than the copper alloy portion 21, the precipitation phases 25 are precipitated in the vicinity of the interface 21a of the copper alloy portions 21 that are adjacent to the hard particle portions 23. As used herein, the "vicinity of an interface of a copper alloy portion" refers to an area from an interface 21a to approximately 1 μm inside a copper alloy portion 21 as illustrated by the arrow X in the figure.

In the illustrated example, the base substrate 10 includes a plastically deformed portion 10b including a flattened recess, and the coating layer 20 includes a plastically deformed portion 20b in which the copper alloy portion 21 with flat shape is accumulated.

In the illustrated example, the laminated member 1 includes an intermediate layer 30 over the entire gap between the base substrate 10 and the coating layer 20. The intermediate layer 30 includes a diffusion layer or an intermetallic compound layer or includes a diffusion layer and an intermetallic compound layer. When the intermediate layer includes a diffusion layer, the intermediate layer may consist of the diffusion layer. When the intermediate layer includes an intermetallic compound layer, the intermediate layer may consist of the intermetallic compound layer.

The intermediate layer 30 will be described in more detail. The intermediate layer includes a diffusion layer or an intermetallic compound layer or includes a diffusion layer and an intermetallic compound layer. In a preferred example, the diffusion layer has a gradient structure of the composition. However, the diffusion layer is not limited to such layers with a gradient structure of the composition. In a preferred example, the intermediate layer with an intermetallic compound layer includes diffusion layers with a gradient structure of the composition between which the intermetallic compound layer intervenes. However, the intermediate layer is not limited thereto. For example, the intermediate layer contains the constituent elements of the base substrate and the constituent elements of the copper alloy portions. Specifically, when the base substrate is made of an aluminum alloy, the intermediate layer to be formed is made of an alloy that contains aluminum and copper. However, the intermediate layer is not limited thereto. For example, when the base substrate is made of stainless steel (SUS), the intermediate layer to be formed is made of an alloy that contains the constituent elements of the stainless steel (SUS) and copper.

A copper alloy portion is more likely to be bonded to another copper alloy portion or a hard particle portion than a hard particle portion to another hard particle portion, which will be described later in detail. The coating layer may have pores (not shown).

The laminated member, which is produced by the above-described method for producing the laminated member of the present invention, includes the base substrate and the coating layer formed on the base substrate. The coating layer includes the copper alloy portion derived from the precipitation hardening copper alloy particles and the hard particle portion that is derived from the predetermined hard particles and that is harder than the copper alloy portion, in which these portions are bonded to each other (e.g. the copper alloy portion to the copper alloy portion, the copper alloy portion to the hard particle portion, and the hard particle portion to the hard particle portion) via an interface. Therefore, the laminated member has a secondary advantage of high abrasion resistance. Further, the laminated member also has a secondary advantage that the coating layer can secure high heat conductivity.

It is currently assumed that the above-described advantageous effects are obtained based on at least one of the following reasons.

For example, when the base substrate has an oxide coating on the surface that inhibits adhesion between the base substrate and the coating layer, it is assumed that spraying the mixture containing the copper alloy particles and the hard particles onto the base substrate and resultant collision of the non-spherical hard particles with the base substrate removes the oxide coating to expose and form a new interface of the base substrate that has good adhesion with the coating layer.

Moreover, for example, when the copper alloy particles collide with the base substrate and the copper alloy portions attached on the base substrate, it is assumed that the kinetic energy thereof is partly converted to thermal energy, which promotes deposition and atomic diffusion between the base substrate and the copper alloy particles and between the copper alloy particles and the copper alloy portions.

Further, for example, when the copper alloy particles collide with the base substrate, the copper alloy particles bite into the base substrate. It is assumed that this anchor effect improves the adhesion between the base substrate and the coating layer. In other words, the plastically deformed portions formed on the base substrate, which are composed of flattened recesses, improves the adhesion between the base substrate and the coating layer.

Furthermore, for example, when the copper alloy particles collide with the base substrate and the copper alloy portions attached on the base substrate, the copper alloy particles and the copper alloy portions are deformed into a flat shape. It is assumed that this deformation improves the adhesion between the copper alloy portions in the coating layer. In other words, the copper alloy portions with flat shape are accumulated to form the plastically deformed portions in the coating layer, which reduces a gap between the copper alloy portions to improve the adhesion between the copper alloy portions in the coating layer.

Still furthermore, for example, when the copper alloy particles collide with the base substrate and the copper alloy portions attached on the base substrate, heat is generated during plastic deformation that forms the flattened recesses in the base substrate and that deforms the copper alloy particles and the copper alloy portions into a flat shape, in other words during the formation of the plastically deformed portions of the base substrate and the coating layer. It is assumed that this heat promotes deposition and atomic diffusion between the base substrate and the copper alloy particles and between the copper alloy particles and the copper alloy portions.

Still furthermore, for example, when the hard particles collide with the base substrate and the copper alloy portions attached on the base substrate, the hard particles bite into the base substrate and the copper alloy portions. It is assumed that this anchor effect improves the adhesion between the base substrate and the coating layer. In other words, the plastically deformed portions formed on the base substrate, which are composed of flattened recesses, improves the adhesion between the base substrate and the coating layer.

Still furthermore, for example, since the hard particle portions have a non-spherical shape, the copper alloy portions bite into the hard particle portions. It is assumed this anchor effect improves the adhesion between the copper alloy portions and the hard particle portions in the coating layer.

Still furthermore, for example, at least one precipitation phase is present at least in a part of the copper alloy portions and at the interface between the copper alloy portions. It is assumed that this precipitation hardening of the copper alloy portions is one of the reasons.

Still furthermore, for example, when the copper alloy particles collide with the base substrate, the kinetic energy thereof is partly converted to thermal energy, which promotes diffusion of the constituent elements between the base substrate and at least one of the copper alloy particles and the copper alloy portions to form the intermediate layer including at least one of the diffusion layer and the intermetallic compound layer between the base substrate and the coating layer. It is assumed that the formation of the intermediate layer is one of the reasons.

However, even when the above-described advantageous effects are obtained based on the other reasons, it is needless to say that the present invention encompasses such laminated members and the like.

The porosity of the coating layer 20 is not particularly limited. However, for example, when the porosity of the coating layer is high, the insufficient strength may lead to the decreased abrasion resistance at high temperature. In this respect, it is preferred that the porosity of the coating layer is as low as possible. Further, to achieve the laminated member with high heat conductivity, it is preferred that the porosity of the coating layer in a cross section is equal to or less than 3 area %, more preferably equal to or less than 1 area %, particularly 0 area %. Since it is currently possible to reduce the porosity up to 0.1 area %, it is preferred that the porosity ranges from 0.1 area % to 3 area % in terms of achieving high abrasion resistance, an improvement of the productivity and the like in a good balance. However, it is needless to say that the porosity is not limited to these ranges at all and may be out of these ranges as long as the advantageous effects of the present invention can be obtained. For example, the porosity in a cross section of the coating layer can be calculated by observation of a scanning electron microscopic (SEM) image or the like of a cross section of the coating layer and image processing of the scanning electron microscopic (SEM) cross-sectional image such as binarization.

The thickness of the coating layer 20 is not particularly limited. That is, the thickness of the coating layer may be suitably adjusted according to the temperature and the environment (e.g. sliding environment) of the portion to be coated. For example, the thickness of the coating layer ranges preferably from 0.05 mm to 5.0 mm, more preferably from 0.1 mm to 2.0 mm. When the thickness is less than 0.05 mm, the coating layer itself has insufficient rigidity. Especially when the strength of the base substrate is low, the coating layer may be plastically deformed. When the thickness is greater than 10 mm, the coating layer may peel off depending on the relationship between the residual stress generated in the formation of the coating layer and the adhesive strength at the interface.

The percentage of the hard particle portions in a cross section of the coating layer is not particularly limited but ranges preferably from 1 area % to 50 area %, more preferably from 1 area % to 25 area %, still more preferably from 1 area % to 18 area %, particularly preferably from 5 area % to 18 area % in terms of improving the abrasion resistance, the tensile strength, and if necessary, the heat conductivity. However, it is needless to say that the percentage is not limited to these ranges at all and may be out of these ranges as long as the advantageous effects of the present invention are obtained. For example, the percentage of the hard particle portions in a cross section of the coating layer can be calculated by observation of a scanning electron microscopic (SEM) image or the like of a cross section of the coating layer and image processing of the scanning electron microscopic (SEM) cross-sectional image such as binarization. Further, it is needless to say that area % calculated by observation of a cross section can be regarded as volume %, and volume % can be converted to weight % using the density of the respective particles.

The percentage of the hard particle portion in a cross section of the coating layer ranges preferably from 1 area % to 50 area % in terms of improving the abrasion resistance and the heat conductivity. However, for an application that does not essentially require high heat conductivity but requires only high abrasion resistance, the percentage of the hard particle portion in a cross section of the coating layer may range from 50 area % to 99 area %. Further, the coating layer may include a third portion in addition to the copper alloy portion and the hard particle portion.

For example, the above-described laminated member can be used as a sliding member. It is needless to say that the front side of the laminated member is used as a sliding surface.

As an example of the sliding member, a sliding member, in which the above-described coating layer is formed on a sliding surface of a seat portion for an engine valve of a cylinder head, which is a sliding portion of a cylinder head and an engine valve, can be mentioned. As a result, high abrasion resistance is imparted. Further, when the sliding member is applied to a cylinder head, it is possible to omit a press-fit valve seat. This improves the flexibility in the shape of an exhaust port and an intake port and enables increasing the diameter of an engine valve. Therefore, it is possible to improve the fuel consumption, the power output, the torque of an engine.

As another example of the sliding member, a sliding member, in which the above-described coating layer is formed on either or both sliding surfaces of a valve stem and the counterpart valve guide and/or on at least one sliding surface selected from the group consisting of a sliding surface at an end of a valve stem shaft, a sliding surface of a valve face and a sliding surface of a press-fit valve seat, can be mentioned. As a result, high abrasion resistance is imparted.

As yet another example of the sliding member, a sliding member, in which the above-described coating layer is formed on a sliding surface of a bearing metal of a bearing mechanism of an internal combustion engine, can be mentioned. In still another example of the sliding member, the coating layer can be directly formed on a sliding surface on the big end part side of a connection rod (directly formed without using a metal). In still another example of the sliding member, the coating layer can be directly formed on a sliding surface on the small end part side of a connection rod (directly formed without using a metal).

The sliding member is also applicable to a piston ring and a piston. That is, the coating layer is preferably applied to the surface of a piston ring. Further, the coating layer is preferably applied to the inner surface of a ring groove of a piston. In the sliding member, the coating layer is preferably applied to an inner surface of a cylinder bore (in place of a cylinder liner or bore thermal spraying). In the sliding member, the coating layer is preferably applied to a metal of a crankshaft journal. Further, in the sliding member, it is preferred that the coating layer is directly formed on a crankshaft journal at a portion corresponding to a metal (i.e. the coating layer is directly formed without a metal). In the sliding member, the coating layer is preferably applied to the surface of a metal of a camshaft journal. Further, in the sliding member, it is preferred that the coating layer is directly formed on a camshaft journal at a portion corresponding to a metal (i.e. the coating layer is directly formed without using a metal). In the sliding member, the coating layer is preferably applied to the surface of a cam lobe of a camshaft. Further, in the sliding member, the coating layer is preferably applied to a piston and a metal of a piston pin. In the sliding member, it is preferred that the coating layer is directly formed on a piston and a metal portion of a piston pin. Further, in the sliding member, the coating layer is preferably applied to the surface of a piston skirt. In the sliding member, the coating layer is preferably applied to the crown surface of a valve lifter. Further, in the sliding member, the coating layer is preferably applied to the side surface of a valve lifter. In the sliding member, the coating layer is preferably applied to a sliding surface of a lifter bore against a valve lifter in a cylinder head. In the sliding member, the coating layer is preferably applied to the surface of teeth of a sprocket (in this case, e.g. the coating layer is formed on a sprocket of an aluminum sintered alloy instead of a sprocket of an iron sintered alloy). In the sliding member, the coating layer is preferably applied to pins of a chain. Further, in the sliding member, the coating layer is preferably applied to chain plates. As a result, high abrasion resistance is imparted.

In the sliding member, the coating layer is preferably applied to the surface of teeth of a gear of an object that is not an internal combustion engine (in this case, e.g. a gear of an aluminum alloy is used instead of a steel gear, and the coating layer is formed on the aluminum alloy). As used herein, examples of objects that are not an internal combustion engine include an automobile differential gear, an automobile power generator, a non-automobile power generator. The sliding member is preferably applied to general slide bearings (slide bearings in a broad sense that are not roller bearings). As a result, high abrasion resistance is imparted.

EXAMPLES

Hereinafter, the present invention will be described in more detail with examples. However, the present invention is not limited to the following examples.

Example 1

As copper alloy particles of raw material, copper-nickel-silicon alloy particles (composition: Cu-3Ni-0.7Si, water-atomized particles, aspect ratio (median): 1.59, Vickers hardness: 64 HV (0.01), average particle size (d50): 27.7 μm, compressive strength: 67.1 N/mm$^2$) were prepared.

As hard particles of raw material, cobalt-based alloy particles (TRIBALOY (registered trademark) T-400, Kennametal Stellite Corp., water-atomized particles, aspect ratio (median): 1.74, Vickers hardness: 957 HV (0.01), average particle size (d50): 13.5 μm) were prepared.

The aspect ratio (median) was measured and calculated by enlarging a scanning electron microscopic (SEM) image and measuring the size with a scale. The Vickers hardness was measured and calculated according to the Vickers hardness test specified in Japanese Industrial Standard (JIS Z 2244). The average particle size (d50), which is number average particle size, was measured and calculated with an image analytical particle size distribution measuring instrument. A "particle size" represented the maximum distance between arbitral two points on the contour of an observed particle (in an observation plane). The compressive strength was measured as a load that is applied to particles with a micro compression tester (MCT-510, Shimadzu Corp.) when the particle size in the load applying direction was changed by 10%. The measurement were made for ten pieces to obtain the arithmetic average.

A preprocessed aluminum base substrate was prepared by preprocessing an aluminum base substrate (Japanese Industrial Standard H 4040 A5056), assuming the target thickness of a coating layer is 0.2 mm in a finished condition of a seat portion for an engine valve of a cylinder head.

Then, the aluminum base substrate was mounted on a rotary table, and a mixture of the copper alloy particles and the hard particles (copper alloy particles:hard particles=50:50 (mass ratio)) was sprayed onto the prepared aluminum base substrate with a high-pressure cold sprayer (PCS-1000, Plasma Giken Corp., operating gas:nitrogen at a temperature of 600° C. and a pressure of 4 MPa) while rotating the rotary table, so as to form a coating layer with a thickness of from 0.4 mm to 0.5 mm on the base substrate.

Thereafter, the coating layer was finished by machining into a shape of the seat portion for the engine valve of the actual cylinder head. The laminated member of the example was thus obtained. The thickness of the coating layer was 0.2 mm (the same applies to the following examples). The specification is partly shown in Table 1.

Example 2 to Example 12, Comparative Example 1 and Comparative Example 2 The laminated members of the Examples and the Comparative Examples were obtained by repeating the same procedure as that in Example 1 except that the specification of the copper alloy particles and the hard particles was changed as indicated in Table 1 to Table 3. TRIBALOY (registered trademark) T400 and T-700 are products of Kennametal Stellite Corp.

TABLE 1

| | | Example 1 | Example 2 | Example 3 | Example 4 | Example 5 |
|---|---|---|---|---|---|---|
| Copper alloy Particles | Material | Cu-3Ni-0.75Si | | | | |
| | Production method of particles | Water atomization | High pressure water atomization | Water atomization | Water atomization | Water atomization |
| | Aspect ratio (median) | 1.59 | 1.64 | 1.59 | 1.59 | 1.59 |
| | Vickers Hardness (HV 0.01) | 64 | 87 | 64 | 64 | 64 |
| | Average particle size (d50) (μm) | 27.7 | 31.6 | 27.7 | 27.7 | 27.7 |
| | Compressive strength (N/mm$^2$) | 67.1 | 77.3 | 67.1 | 67.1 | 67.1 |
| Hard Particles | Material | TRIBALOY T-400 | | | | |
| | Production method of particles | Water atomization | | | | |
| | Aspect ratio (median) | 1.74 | 1.40 | 1.77 | 1.68 | 1.61 |
| | Vickers Hardness (HV 0.01) | 957 | 784 | 784 | 896 | 722 |
| | Average particle size (d50) (μm) | 13.5 | 15.8 | 18.3 | 23.8 | 26.5 |
| Layer forming conditions | Blend ratio (mass ratio) copper alloy particles:hard particles | 50:50 | | | | |
| | Gas temperature (° C.) | 600 | | | | |
| | Gas pressure (MPa) | 4 | | | | |
| Coating layer | Percentage of copper alloy portion (area %) | — | 83.7 | — | 83.3 | 84.4 |
| | Percentage of hard particle portion (area %) | — | 15.3 | — | 16.1 | 15.0 |
| | Porosity (area %) | — | 1.0 | — | 0.6 | 0.6 |
| | Vickers Hardness of copper alloy portion (HV 0.1) | 219 | 225 | 229 | 208 | 214 |
| | Vickers hardness of hard particle portion (HV 0.025) | — | — | — | 979 | 977 |
| | Adhesion ratio (%) | 56.3 | 57.6 | 57.9 | 58.3 | 57.7 |
| | Abrasion resistance (amount of abrasion, μm) | 23.6 | 17.3 | 11.4 | — | — |

TABLE 2

| | | Example 6 | Example 7 | Example 8 | Example 9 | Example 10 |
|---|---|---|---|---|---|---|
| Copper alloy Particles | Material | Cu-3Ni-0.7Si | | | | |
| | Production method of particles | Water atomization | | | | |
| | Aspect ratio (median) | 1.59 | | | | |
| | Vickers Hardness (HV 0.01) | 64 | | | | |
| | Average particle size (d50) (μm) | 27.7 | | | | |
| | Compressive strength (N/mm$^2$) | 67.1 | | | | |
| Hard Particles | Material | TRIBALOY T-400 | | | | |
| | Production method of particles | Water atomization | | | | |
| | Aspect ratio (median) | 1.70 | 1.50 | 1.59 | 1.68 | 1.72 |
| | Vickers Hardness (HV 0.01) | 730 | 846 | 732 | 783 | 729 |
| | Average particle size (d50) (μm) | 29.8 | 32.4 | 33.8 | 37.5 | 38.0 |
| Layer forming conditions | Blend ratio (mass ratio) copper alloy particles:hard particles | 50:50 | | | | |
| | Gas temperature (° C.) | 600 | | | | |
| | Gas pressure (MPa) | 4 | | | | |
| Coating layer | Percentage of copper alloy portion (area %) | 82.4 | 83.0 | 82.8 | 82.6 | 82.7 |
| | Percentage of hard particle portion (area %) | 17.1 | 16.6 | 16.4 | 17.0 | 16.6 |
| | Porosity (area %) | 0.4 | 0.4 | 0.8 | 0.4 | 0.5 |
| | Vickers Hardness of copper alloy portion (HV 0.1) | 209 | 214 | 214 | 221 | 210 |
| | Vickers hardness of hard particle portion (HV 0.025) | 971 | 943 | 986 | 952 | 968 |
| | Adhesion ratio (%) | 58.7 | 58.6 | 58.6 | 59.6 | 58.6 |
| | Abrasion resistance (amount of abrasion, μm) | — | — | — | 14.1 | — |

TABLE 3

| | | Example 11 | Example 12 | Comparative Example 1 | Comparative Example 2 |
|---|---|---|---|---|---|
| Copper alloy Particles | Material | Cu-3Ni-0.7Si | | | |
| | Production method of particles | Water atomization | | | |
| | Aspect ratio (median) | 1.59 | | | |
| | Vickers Hardness (HV 0.01) | 64 | | | |
| | Average particle size (d50) (μm) | 27.7 | | | |
| | Compressive strength (N/mm²) | 67.1 | | | |
| Hard Particles | Material | TRIBALOY T-400 | | TRIBALOY T-700 | |
| | Production method of particles | Water atomization | | Water atomization | |
| | Aspect ratio (median) | 1.54 | 1.82 | 1.07 | 10.9 |
| | Vickers Hardness (HV 0.01) | 792 | 823 | 975 | 800 |
| | Average particle size (d50) (μm) | 40.4 | 46.2 | 35.4 | 33.4 |
| Layer forming conditions | Blend ratio (mass ratio) copper alloy particles:hard particles | 50:50 | | | |
| | Gas temperature (° C.) | 600 | | | |
| | Gas pressure (MPa) | 4 | | | |
| Coating layer | Percentage of copper alloy portion (area %) | 80.2 | 81.6 | 96.9 | 94.6 |
| | Percentage of hard particle portion (area %) | 19.1 | 17.6 | 3.0 | 4.7 |
| | Porosity (area %) | 0.7 | 0.8 | 0.1 | 0.7 |
| | Vickers Hardness of copper alloy portion (HV 0.1) | 210 | 203 | — | — |
| | Vickers hardness of hard particle portion (HV 0.025) | 973 | 940 | — | — |
| | Adhesion ratio (%) | 59.1 | 58.7 | 51.0 | 51.9 |
| Abrasion resistance (amount of abrasion, μm) | | — | — | 66.1 | 51.6 |

The percentages of the copper alloy portion and the hard particle portion and the porosity in a cross section of the coating layer of each example in Table 1 to Table 3 were calculated by repeating multiple times observation of a scanning electron microscopic (SEM) image or the like of a cross section of the coating layer and image processing of the scanning electron microscopic (SEM) cross-sectional image such as binarization. The Vickers hardness of the copper alloy portion and the hard particle portion of the coating layer of each example were measured and calculated according to the Vickers hardness test specified in Japanese Industrial Standard (JIS Z 2244). The Vickers hardness was measured at ten points to obtain the arithmetic average. To determine the measuring points, observation of a scanning microscopic (SEM) image, a transmission electron microscopic (TEM) image and the like of the coating layer and the result of an energy dispersive X-ray (EDX) analysis were used. The precipitation phase of the copper alloy portion of each example was specified by observation of a transmission electron microscopic (TEM) image of a cross section of the coating layer and an energy dispersive X-ray (EDX) analysis. The presence or absence of an intermediate layer and the presence or absence of a plastically deformed portion in a cross section of the laminated member of each example were determined by observation of a scanning electron microscopic (SEM) image of a cross section of the coating layer and an energy dispersive X-ray (EDX) analysis. In all of Example 1 to Example 12, Comparative Example 1 and Comparative Example 2, a precipitation phase was observed, and a plastically deformed portion was observed in the base substrate and the coating layer.

Evaluation of Performance

The following performances were evaluated for each example.

Formation Efficiency of Coating Layer

The particles of each example were sprayed onto a flat-plate aluminum base substrate for a certain period of time in the same forming conditions as the coating layer of each example. The amount of particles supplied and the amount of particles unattached were measured, and the adhesion ratio was calculated therefrom. The formation efficiency was thus evaluated. The results are shown in Table 1 to Table 3.

Abrasion Resistance

Figure 4:
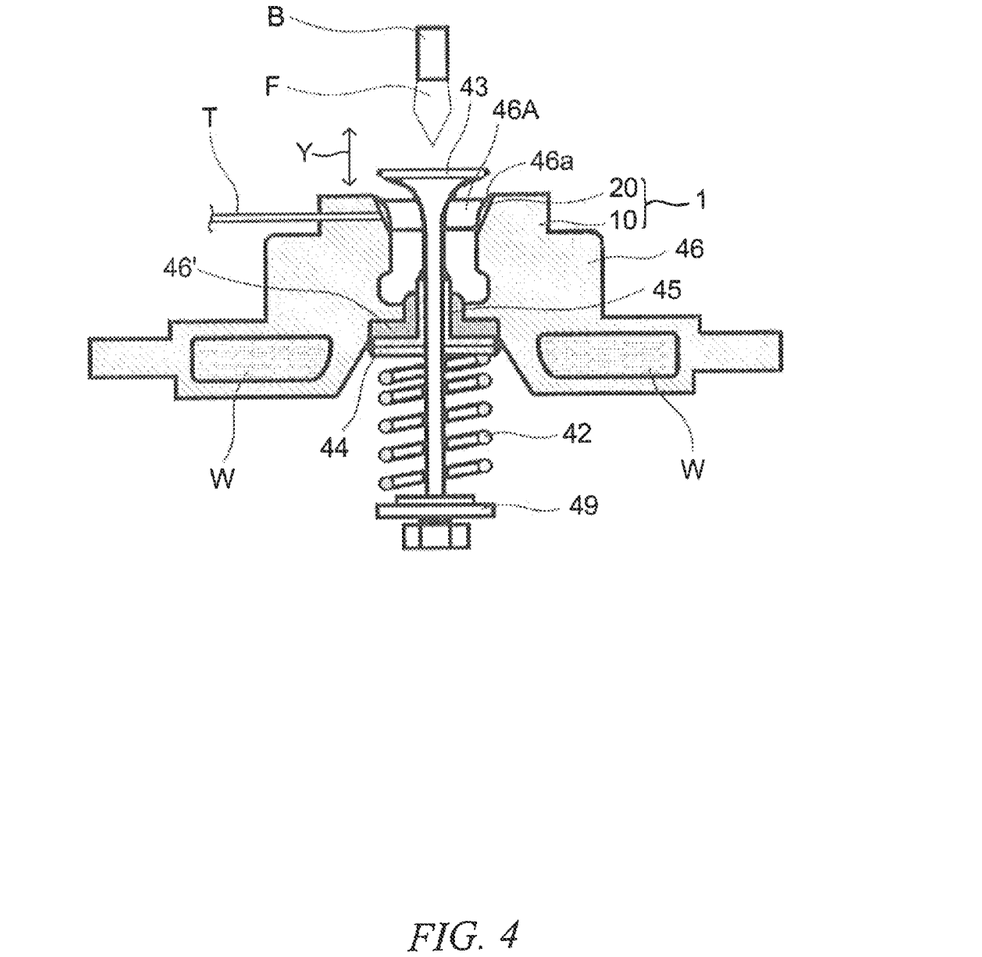
FIG. 4 is a schematic cross-sectional view of an abrasion tester.

FIG. 4 is a schematic cross-sectional view of an abrasion tester. As illustrated in FIG. 4, the abrasion tester resembling a valve actuating mechanism of an engine was fabricated from actual engine parts such as a valve spring 42, an engine valve 43, a stem seal 44, a valve guide 45, a cylinder head 46, 46' and a cotter 49. The laminated member 1 obtained in each of the above examples was applied as a seat portion 46A for the engine valve 43 of the cylinder head 46. The laminated member 1 includes a predetermined coating layer 20 formed on the base substrate 10. The engine valve 43 is in an open state in the figure. The engine valve 43 reciprocates in the vertical direction as illustrated by the arrow Y in the figure by means of an eccentric cam (not shown) so that the engine valve 43 repeatedly opens and closes. The sliding surface 46a of the seat portion 46A for the engine valve 43 of the cylinder head 46 is in a high-temperature environment by means of a flame F of a gas burner B. The temperature of the seat portion 46A is measured with a thermometer T. Cooling water W is circulated in the cylinder head 46.

The amount of abrasion was measured and calculated with the above-described abrasion tester in the following test conditions. Specifically, the shape of the seat portion for the engine valve of the cylinder head was determined with a shape measuring instrument before and after the test. The amount of abrasion was measured at four points, and the average thereof was calculated. The results are shown in Table 1 to Table 3.

Test Conditions

Temperature: 300° C. (A seat portion for an engine valve of a cylinder head on an exhaust port side was simulated.)

Number of inputs: 540000 times

As can be seen from Table 1 to Table 3, Example 1 to Example 12 within the scope of the present invention exhibited high adhesion ratio and high formation efficiency of the coating layer compared to Comparative Example 1 and Comparative Example 2, which are outside of the scope of the present invention, since the coating layer is formed from the predetermined copper alloy particles and the hard particles.

In particular, a comparison of Example 8 and Example 9 with Comparative Example 1 and Comparative Example 2, in which the hard particles with approximately the same average particle size (d50) are used, revealed that the formation efficiency of the coating layer is high in the method for producing the laminated member in which the predetermined non-spherical hard particles are used along with the predetermined copper alloy particles to form the coating layer.

A comparison of Example 8 and Example 9 with Comparative Example 1 and Comparative Example 2, in which the hard particles with approximately the same average particle size (d50) are used, the percentage (area %) of the hard particle portion in the coating layer is high in the method for producing the laminated member in which the predetermined non-spherical hard particles are used along with the predetermined copper alloy particles to form the coating layer.

The percentage (area %) of the hard particle portion in the coating layer is particularly likely to contribute to an improvement of the abrasion resistance of the laminated member. Therefore, it can be understood that the method for producing the laminated member, in which the predetermined non-spherical hard particles are used along with the predetermined copper alloy particles to form the coating layer, has high formation efficiency of the coating layer that has high abrasion resistance.

As can be seen from Table 1 to Table 3, high adhesion ratio and high formation efficiency of the coating layer are achieved when the average particle size (d50) of the copper alloy particles and the hard particles is equal to or less than 50 μm.

Further, as can be seen from Table 1 to Table 3, high adhesion ratio and high formation efficiency of the coating layer are achieved when the average particle size (d50) of the hard particles are within the range of 14 μm to 50 μm, preferably 25 μm to 50 μm.

It can be found that especially when the blend ratio of the copper alloy particles and the hard particles is (copper alloy particles):(hard particles)=50:50 (mass ratio), the adhesion ratio tends to increase with increasing average particle size (d50) of the hard particles within the range of the average particle size (d50) of the hard particles of 14 μm to 50 μm.

Further, it can be found that when the blend ratio of the copper alloy particles and the hard particles is (copper alloy particles):(hard particles)=50:50 (mass ratio), the ratio of the hard particle portion (area %) tends to increase with increasing average particle size (d50) of the hard particles within the range of the average particle size (d50) of the hard particles of 14 μm to 50 μm.

When the copper alloy particles and the hard particles of Example 2 are mixed in various blend ratios of (copper alloy particles):(hard particles)=100:0 to 50:50 (mass ratio), the adhesion ratio is 98.9% ((copper alloy particles):(hard particles)=100:0 (mass ratio)), 91.0% ((copper alloy particles):(hard particles)=90:10 (mass ratio)), 82.9% ((copper alloy particles):(hard particles)=80:20 (mass ratio)), 73.9% ((copper alloy particles):(hard particles)=70:30 (mass ratio)), 66.5% ((copper alloy particles):(hard particles)=60:40 (mass ratio)), 57.6% ((copper alloy particles):(hard particles)=50:50 (mass ratio)). Considering these blend ratios and the adhesion ratios, for example, it is assumed that a preferred range of the blend ratio of the copper alloy particles and the hard particles is (copper alloy particles):(hard particles)=70:30 to 50:50 (mass ratio). However, the blend ratio is not particularly limited thereto.

As can be seen from Table 1 to Table 3, it is also assumed that high adhesion ratio and high formation efficiency of the coating layer are due to the hard particles that are cobalt-based alloy particles. Further, it is also assumed that high abrasion resistance of the laminated member is due to the hard particles that are cobalt-based alloy particles.

As can be seen from Table 1 to Table 3, it is also assumed that high adhesion ratio and high formation efficiency of the coating layer are due to the compressive strength of the copper alloy particles that are within the range of 50 N/mm$^2$ to 110 N/mm$^2$. Further, it is also assumed that the high abrasion resistance of the laminated member is due to the compressive strength of the copper alloy particles that are within the ranges of 50 N/mm$^2$ to 110 N/mm$^2$.

Figure 5:
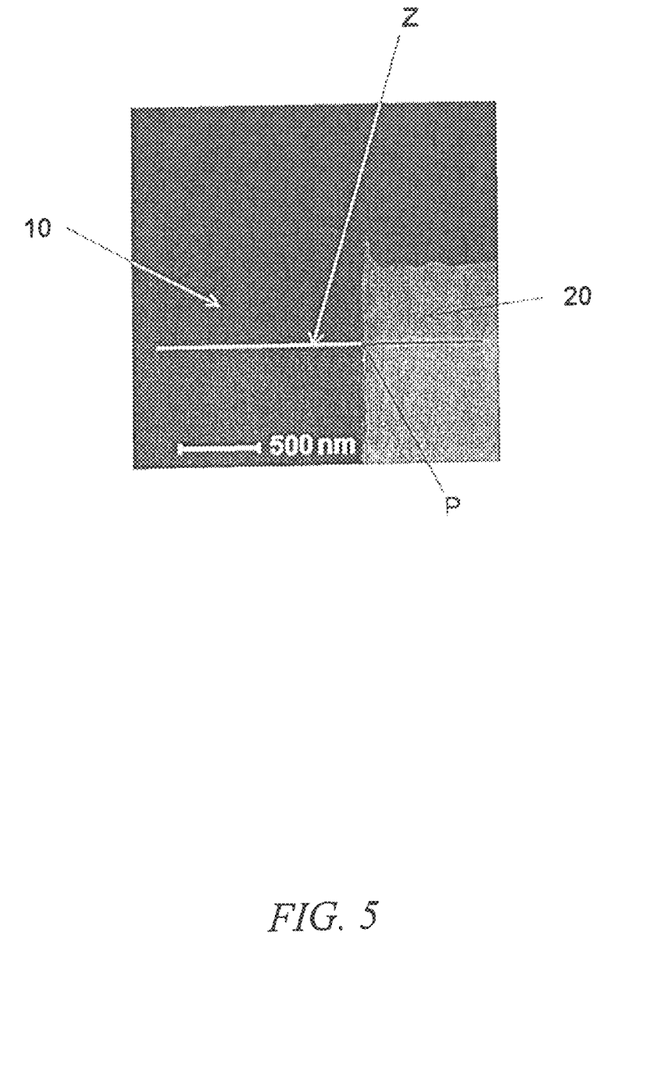
FIG. 5 is a transmission electron microscopic (TEM) cross-sectional image of the laminated member of Example 2.
Figure 6:
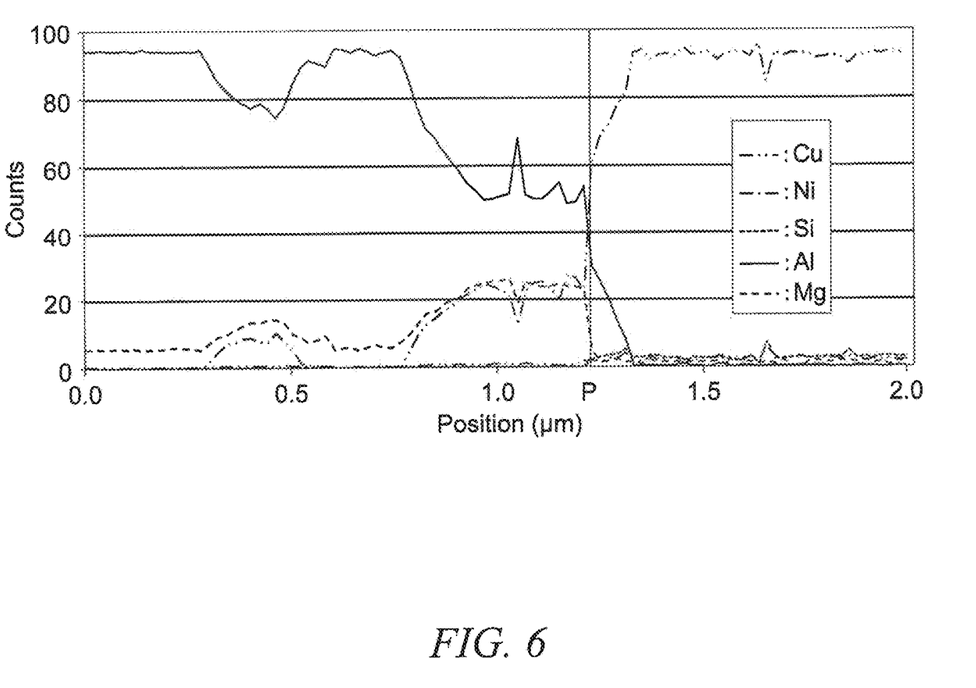
FIG. 6 is a graph illustrating the result of an energy dispersive X-ray (EDX) analysis of the laminated member of Example 2.

FIG. 5 is a transmission electron microscopic (TEM) cross-sectional image of the laminated member of Example 2 around the interface between the base substrate 10 and the coating layer 20. FIG. 6 is a graph illustrating a result of an energy dispersive X-ray (EDX) analysis (linear analysis) of the laminated member of Example 2 along the line Z in FIG. 5. The point P in FIG. 5 indicates the same point as the point P in FIG. 6. In FIG. 6, the point of 0.0 μm corresponds to the end part of the line Z on the base substrate 20 side, and the point of 2.0 μm corresponds to the end part of the line Z on the coating layer 20 side in FIG. 5.

As can be seen in FIG. 5 and FIG. 6, the laminated member includes the base substrate 10 of an aluminum alloy, a coating layer 20 of a copper alloy formed on the base substrate 10 and an intermediate layer that is formed between the base substrate 10 and the coating layer 20. The intermediate layer is formed in the area from approximately 0.75 μm to 1.31 μm. Further, diffusion layers are formed in the area approximately from 0.75 μm to 0.96 μm and in the area approximately from 1.23 μm to 1.31 μm. The diffusion layers have a gradient structure of the composition. Further, in the area from approximately 0.96 μm to 1.23 μm, the ratio of aluminum, magnesium and copper is approximately Al:Mg:Cu=2:1:1 (atomic ratio), which indicates an intermetallic compound layer is formed.

It is also assumed that such high abrasion resistance of the laminated member as Example 2 was due to the presence of the intermediate layer that is formed at least in a part of a gap between the base substrate and the coating layer and that includes both the diffusion layers and the intermetallic compound layer. Further, it is also assumed that such high abrasion resistance of the laminated member as Example 2 was due to the presence of the intermediate layer that includes the diffusion layers with a gradient structure of the composition or that includes the intermetallic compound layer intervening between the diffusion layers with a gradient structure of the composition.

While the present invention is described with some embodiments and examples, the present invention is not limited thereto, and a variety of changes can be made within the scope of the present invention.

For example, the components of the above-described embodiments and examples are not limited to the respective embodiments and examples. For example, changes can be made in the components such as the specification and the blend ratio of the copper alloy particles and the hard particles and the layer forming conditions. Further, the components of the embodiments and the examples can be combined in a different way from the above-described embodiments and examples.

REFERENCE SINGS LIST

1: Laminated member
10: Base substrate
10b: Plastically deformed portion
20: Coating layer
20b: Plastically deformed portion
21: Copper alloy portion
21a: Interface
23: Hard particle portion
25: Precipitation phase
30: Intermediate layer
42: Valve spring
43: Engine Valve
44: Stem seal
45: Valve guide
46, 46': Cylinder head
46A: Seat portion
46a: Sliding surface
49: Cotta
B: Gas burner
F: Flame
T: Thermometer
W: Cooling water

The invention claimed is:

1. A method for producing a laminated member, the method comprising: a step of spraying a mixture in a non-molten state including precipitation hardening copper alloy particles and hard particles that have non-spherical shapes having a median aspect ratio of equal to or more than 1.2 and are harder than the copper alloy particles onto a base substrate to form a coating layer on the base substrate.

2. The method for producing the laminated member according to claim 1, wherein an average particle size (d50) of the copper alloy particles and an average particle size (d50) of the hard particles are both equal to or less than 50 µm.

3. The method for producing the laminated member according to claim 1, wherein an average particle size (d50) of the hard particles is within the range of 14 µm to 50 µm.

4. The method for producing the laminated member according to claim 1, wherein the hard particles comprise at least one type of alloy particles selected from the group consisting of cobalt-based alloy particles, chromium-based alloy particles, nickel-based alloy particles and molybdenum-based alloy particles.

5. The method for producing the laminated member according to claim 1, wherein a compressive strength of the copper alloy particles is within the range of 50 N/mm$^2$ to 110 N/mm$^2$.

6. The method for producing the laminated member according to claim 2, wherein an average particle size (d50) of the hard particles is within the range of 14 µm to 50 µm.

7. The method for producing the laminated member according to claim 2, wherein the hard particles comprise at least one type of alloy particles selected from the group consisting of cobalt-based alloy particles, chromium-based alloy particles, nickel-based alloy particles and molybdenum-based alloy particles.

8. The method for producing the laminated member according to claim 3, wherein the hard particles comprise at least one type of alloy particles selected from the group consisting of cobalt-based alloy particles, chromium-based alloy particles, nickel-based alloy particles and molybdenum-based alloy particles.

9. The method for producing the laminated member according to claim 6, wherein the hard particles comprise at least one type of alloy particles selected from the group consisting of cobalt-based alloy particles, chromium-based alloy particles, nickel-based alloy particles and molybdenum-based alloy particles.

10. The method for producing the laminated member according to claim 2, wherein a compressive strength of the copper alloy particles is within the range of 50 N/mm$^2$ to 110 N/mm$^2$.

11. The method for producing the laminated member according to claim 3, wherein a compressive strength of the copper alloy particles is within the range of 50 N/mm$^2$ to 110 N/mm$^2$.

12. The method for producing the laminated member according to claim 4, wherein a compressive strength of the copper alloy particles is within the range of 50 N/mm$^2$ to 110 N/mm$^2$.

13. The method for producing the laminated member according to claim 6, wherein a compressive strength of the copper alloy particles is within the range of 50 N/mm$^2$ to 110 N/mm$^2$.

14. The method for producing the laminated member according to claim 7, wherein a compressive strength of the copper alloy particles is within the range of 50 N/mm$^2$ to 110 N/mm$^2$.

15. The method for producing the laminated member according to claim 8, wherein a compressive strength of the copper alloy particles is within the range of 50 N/mm$^2$ to 110 N/mm$^2$.

16. The method for producing the laminated member according to claim 9, wherein a compressive strength of the copper alloy particles is within the range of 50 N/mm$^2$ to 110 N/mm$^2$.

* * * * *